(12) United States Patent
Takahashi et al.

(10) Patent No.: US 6,941,128 B2
(45) Date of Patent: Sep. 6, 2005

(54) MOBILE COMMUNICATION TERMINAL AND CONTROL DATA CHANGING METHOD THEREOF

(75) Inventors: Shinya Takahashi, Hino (JP); Yoshihito Bando, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 496 days.

(21) Appl. No.: 10/107,303

(22) Filed: Mar. 28, 2002

(65) Prior Publication Data

US 2002/0142755 A1 Oct. 3, 2002

(30) Foreign Application Priority Data

Mar. 28, 2001 (JP) ........................................ 2001-092720

(51) Int. Cl.⁷ ........................... H04M 1/66; H04M 1/00; G06F 12/00
(52) U.S. Cl. ......................... 455/411; 711/151; 379/355
(58) Field of Search ................... 379/355.01; 307/10.5; 701/36; 711/151; 704/275; 455/411, 410, 551, 380, 435, 435.1, 26.1, 528

(56) References Cited

U.S. PATENT DOCUMENTS

| | | | | |
|---|---|---|---|---|
| 4,724,537 A | * | 2/1988 | Monet | ........................ 455/565 |
| 4,945,556 A | * | 7/1990 | Namekawa | .................. 455/565 |
| 5,020,091 A | * | 5/1991 | Krolopp et al. | .............. 455/551 |
| 5,408,629 A | * | 4/1995 | Tsuchiva et al. | ............. 711/151 |
| 5,561,712 A | * | 10/1996 | Nishihara | .............. 379/355.01 |
| 5,602,963 A | * | 2/1997 | Bissonnette et al. | ......... 704/275 |
| 5,848,360 A | * | 12/1998 | O'Connell et al. | ......... 455/551 |
| 6,073,016 A | * | 6/2000 | Hulthen et al. | .......... 455/435.2 |
| 6,073,064 A | * | 6/2000 | Konrad et al. | ................. 701/36 |
| 6,141,544 A | * | 10/2000 | Corriveau et al. | .......... 455/411 |
| 6,204,570 B1 | * | 3/2001 | Muller | ...................... 307/10.5 |
| 2002/0177438 A1 | * | 11/2002 | Sakai et al. | ................. 455/432 |

* cited by examiner

Primary Examiner—William Trost
Assistant Examiner—Kiet Doan
(74) Attorney, Agent, or Firm—Finnegan, Henderson, Farabow, Garrett & Dunner, L.L.P.

(57) ABSTRACT

When a control data stored in a memory is changed, an operation mode of a mobile communication terminal is set according to an input of a security code to a registration preparing state where a lock code can be registered. Next, in the registration preparing state, the input lock code is registered in the memory, and setting the operation mode to a protective state where the stored control data cannot be changed from outside. Then, when a lock release code corresponding to the lock code is input with the protective state being set, the protective state is canceled temporarily, thereby enabling the stored data to be changed. After the change of the stored control data, the registration of the lock code is deleted, and restoring the registration preparing state.

13 Claims, 4 Drawing Sheets

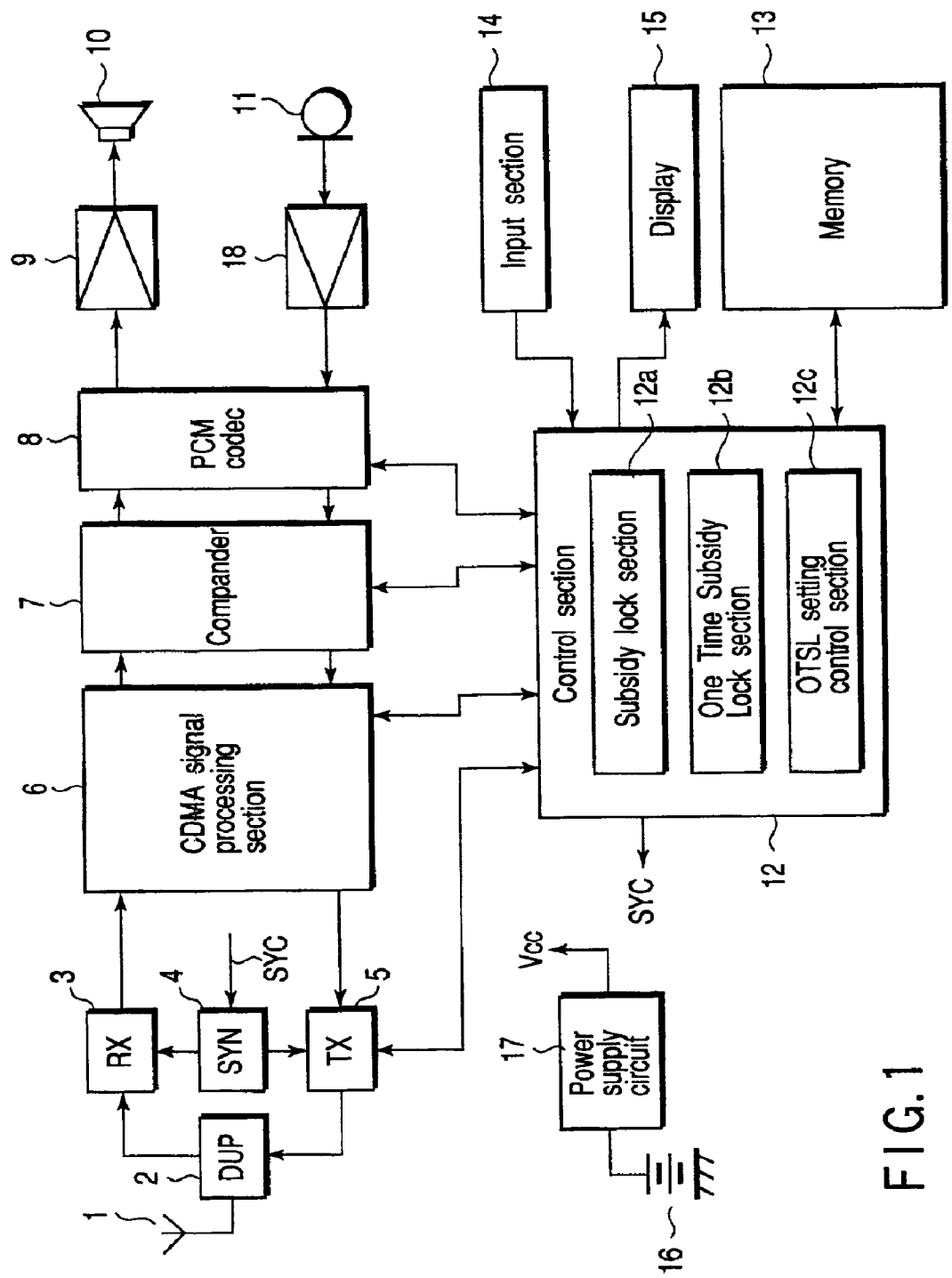
F I G. 1

State A (state used by carrier or maker)

| Subsidy Lock Code | Unregistered |
|---|---|
| Subsidy Lock Status | Invalid |
| One Time Subsidy Lock Code | Unregistered |
| One Time Subsidy Lock Status | Invalid |

6a: Enable the registration of Subsidy Lock Code

6b: Register Subsidy Lock Code ＊＊＊＊＊＊(SPC)

State B (state used by user after state D and state used by carrier or maker)

| Subsidy Lock Code | Registered (＊＊＊＊＊＊ SPC) |
|---|---|
| Subsidy Lock Status | Valid (Lock) |
| One Time Subsidy Lock Code | Unregistered |
| One Time Subsidy Lock Status | Registered |

6c: Enable the registration of OTSL Code ＊＊＊＊＊＊(SPC)

6d: Register One Time Subsidy Lock Code ＃＃＃＃＃＃

State C (state when user purchases terminal)

| Subsidy Lock Code | Registered (＊＊＊＊＊＊ SPC) |
|---|---|
| Subsidy Lock Status | Valid (Lock) |
| One Time Subsidy Lock Code | Registered (＃＃＃＃＃＃) |
| One Time Subsidy Lock Status | Valid (Lock) |

6e: Release One Time Subsidy Lock ＃＃＃＃＃＃

Sate D (Registering operation before use)

6f: Simple NAM Programming

FIG. 6

MOBILE COMMUNICATION TERMINAL AND CONTROL DATA CHANGING METHOD THEREOF

CROSS-REFERENCE TO RELATED APPLICATIONS

This application is based upon and claims the benefit of priority from the prior Japanese Patent Application No. 2001-092720, filed Mar. 28, 2001, the entire contents of which are incorporated herein by reference.

BACKGROUND OF THE INVENTION

1. Field of the Invention

This invention relates to a mobile communication terminal, such as a mobile phone or a PDA (Personal Digital Assistant), and a control data changing method thereof.

2. Description of the Related Art

Generally, the control memory of a mobile communication terminal stores an Authentication Key (A-Key) necessary for authentication in establishing communication, Number Assignment Module (NAM) Programming (hereinafter, abbreviated as NAM Pro), and a control data group set by the NAM Pro. The control data group is required for the carrier to manage the operation of mobile communication terminals suitably. Therefore, if a user changes the control data group arbitrarily after starting to use the mobile communication terminal, the carrier cannot guarantee proper service.

To overcome this problem, a conventional mobile communication terminal applies a guard called "Subsidy Lock" to the control data group, thereby preventing the control data group from being changed easily. The Subsidy Lock is set and released by a guard control code called a "Subsidy Lock Code." A highly secure code, such as SPC, is used as the "Subsidy Lock Code."

When a user purchases a mobile communication terminal, the salesclerk or user himself or herself registers control data, including the phone number allocated by the carrier to which the user subscribes, in the control memory of the mobile communication terminal. To register the control data, it is necessary to temporarily release the Subsidy Lock on the control data group already registered in the terminal. However, releasing the Subsidy Lock introduces the danger that other control data groups registered will be changed by the user accidentally or intentionally.

To avoid this problem, for example, the NAM Pro is provided with Simple NAM Programming (hereinafter, abbreviated as Simple NAM Pro) for changing only part of the control data, such as the phone number or the system ID. Then, when the phone number or the like is registered, only the Simple NAM Pro is started up. If the Simple NAM Pro is caused to remain running, there is a possibility that the user of the terminal will change the phone number or the like. For this reason, a guard called "One-Time Subsidy Lock" is applied to the Simple NAM Pro, too. The guard of the One-Time Subsidy Lock is released by a guard control code called "One-Time Subsidy Lock Code" only when the phone number is registered at the time of purchase of the terminal.

However, in the case where just inputting the One-Time Subsidy Code to the terminal enables the One-Time Subsidy Lock to be released, if a person knows only the One-Time Subsidy Code, he or she can unlock the guard relatively easily. Therefore, it has not been safe to say that the guard function for the Simple NAM Pro and the control data group set by the Simple NAN Pro is sufficient.

BRIEF SUMMARY OF THE INVENTION

It is accordingly an object of the present invention to provide a mobile communication terminal which prevents the guard of control data from being released easily and thereby improves the control data guarding capability more and a method of changing the control data.

According to an aspect of the present invention, when a control data stored in a memory is changed, a mobile communication terminal is set to a registration preparing state where a lock code can be registered, according to the input of a security code created by a predetermined algorithm. Next, in the registration preparing state, when the lock code is input, the lock code is registered in the memory, thereby setting an operation mode of the mobile communication terminal to a protective state where the control data cannot be changed. Then, when a lock release code corresponding to the lock code is input with the protective state being set, the protective state is canceled temporarily, thereby enabling the data to be changed. After the change of the control data, the registration of the lock code is deleted, and restoring the registration preparing state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

FIG. 1 is a functional block diagram showing an embodiment of a mobile communication terminal according to the present invention;

FIG. 6 shows an example of the transition of the states of Subsidy Lock and One-Time Subsidy Lock.

DETAILED DESCRIPTION OF THE INVENTION

Figure 2:
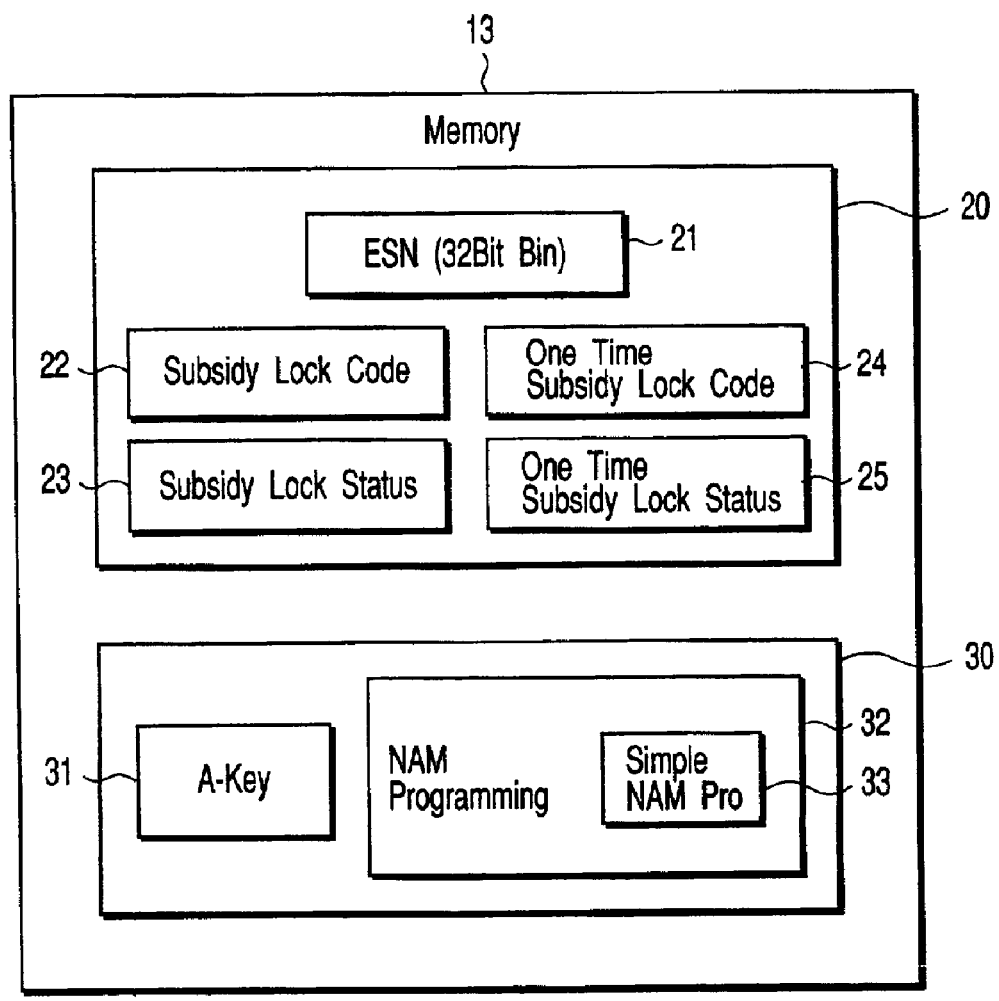
FIG. 2 shows the types of control data groups stored in the memory of the mobile communication terminal shown in FIG. 1.

FIG. 1 is a functional block diagram showing the configuration of a mobile phone terminal, which is an embodiment of a mobile communication terminal according to the present invention.

A radio signal transmitted from a base station (not shown) is received by an antenna 1. The radio signal is then input to a receiving circuit (RX) 3 via a duplexer 2 (DUP). The receiving circuit 3 mixes the radio signal with a local oscillation signal for reception output from a frequency synthesizer (SYN) 4, thereby down-converting the radio signal into an intermediate frequency signal. Then, the reception intermediate frequency signal is demodulated into a reception baseband signal by, for example, an orthogonal demodulation scheme. The frequency of the local oscillation signal for reception generated from the frequency synthesizer 4 is specified by a control signal SYC from a control section 12.

The reception baseband signal is input to a CDMA signal processing section 6. The CDMA signal processing section 6 includes a RAKE receiver. The RAKE receiver subjects a plurality of paths included in the reception baseband signal to an inverse spread process using the respective spreading codes. The signals in the individual paths subjected to the inverse spread process are put in phase with one another and thereafter combined. As a result, reception packet data in a specific transmission format is obtained. Then, the reception packet data is input to a compressor/expander (hereinafter, referred to as a compander) 7.

The compander 7 causes a multiplexer/demultiplexer) to separate the reception packet data output from the CDMA signal processing section 6 on a media data item basis. Then, a decoding process is carried out for each of the separated media data items. For example, if audio data is included in the reception packet data, the audio data is decoded by a speech codec. If video data is included in the reception packet data, the video data is decoded by a video codec. The digital audio signal obtained from the decoding process is input to a PCM codec 8. The digital video signal is input to the control section 12. If text data, such as e-mail, is included in the reception packet data, the text data is input to the control section 12.

The PCM codec 8 PCM-decodes the digital audio signal output from the compander 7, thereby producing an analog audio signal. The analog audio signal is amplified by a receive amplifier 9. The amplified signal is output by a speaker 10.

The control section 12 causes the digital video signal output from the compander 7 to appear on a display 15 with the help of a video memory. The control section 12 not only stores text data, such as e-mail, in a memory 13 but also causes the text data to appear on the display 15. When, for example, the answering mode has been set in the key input section (KEY) 14, the control section 12 takes in the audio data and video date before being decoded at the compander 7 and stores these data items in the memory 13.

When an external information terminal, such as a personal computer, is connected to the mobile phone terminal, the control section 12 transfers the data before being decoded at the compander 7 to the external information terminal via an external interface (not shown).

On the other hand, the speech signal of a user input to a microphone 11 is amplified by a transmit amplifier 18 to a suitable level. The amplified signal is then subjected to a PCM coding process at a PCM codec 8, thereby producing a digital audio signal, which is input to the compander 7. The video signal produced by a camera (not shown) is digitized by the control section 12. The digitized signal is then input to the compander 7. The control section 12 inputs the text data, such as e-mail, created therein to the compander 7.

The compander 7 detects the amount of energy of the input speech from the digital audio signal output from the PCM codec 8. On the basis of the result of the detection, the compander 7 determines a transmission data rate. Then, the compander 7 encodes the digital audio signal into a signal in the format corresponding to the transmission data rate, thereby producing audio data. Furthermore, the compander 7 video-encodes the digital video signal output from the control section 12, thereby creating video data. Then, the multiplexer/demultiplexer packets the audio data and video data according to a specific transmission format. The transmission packet data is then output to the CDMA signal processing section 6. When the control section 12 has output text data, such as e-mail (including short messages), the compander 7 also multiplexes the text data with the transmission packet data.

The CDMA signal processing section 6 subjects the transmission packet data output from the compander 7 to a spectrum spreading process, using the spreading code allocated to the transmission channel. Then, the CDMA signal processing section 6 supplies its output signal to a transmitting circuit (TX) 5. The transmitting circuit 5 modulates the spectrum-spread signal using a digital modulation scheme, such as the QPSK scheme. Then, the transmitting circuit 5 combines the transmission signal produced in the digital modulation with a local oscillation signal generated at the frequency synthesizer 4, thereby frequency-converting the transmission signal into a radio signal. Then, the transmitting circuit 5 high-frequency-amplifies the radio signal to the transmission power level specified by the control section 12. The amplified radio signal is supplied via the duplexer 2 to the antenna 1. Then, the antenna 1 transmits the radio signal toward the base station presently being connected to.

The input key (KEY) 14 is provided with not only dial keys but also function keys, including a send key, an end key, a power key, a volume control key, and a mode specify key. The display 15 is provided with an LCD and an LED. On the LCD, transmission and reception video data and text data, such as e-mail, are displayed. In addition, an address book, the telephone number of the terminal the other party uses, a history of transmission and reception, the operating state of the present terminal, control data, and others are also displayed. The LED is used for indicating an incoming call or displaying the charged state of the battery 16. Numeral 17 indicates a power supply circuit. The power supply circuit 17 generates a specific operating power supply voltage Vcc from the output of the battery 16 and supplies the voltage to each circuit section.

In the memory 13, a first control data group 20 which determines the basic operation of the terminal and a second control data group 30 are stored as shown in FIG. 2.

The first control data group 20 includes a 32-bit electronic serial number (ESN) 21 allocated uniquely to the terminal, Subsidy Lock Code 22, Subsidy Lock Status 23, One-Time Subsidy Lock Code 24, and One-Time Subsidy Lock Status 25.

On the other hand, the second control data group 30 includes an Authentication Key (A-Key) 31, Number Assignment Module Programming (or NAM Programming), and a data group 32 set by the NAM Programming. The NAM Programming 32 includes Simple NAM Programming 33 and data set by Simple NAM Programming 33.

The control section 12, which uses a microprocessor as a main control section, includes the following sections that realize new functions related to the present invention: a Subsidy Lock section 12*a*, a One-Time Subsidy Lock section 12*b*, and a One-Time Subsidy Lock (OTSL) setting control section 12*c*.

Figure 3:
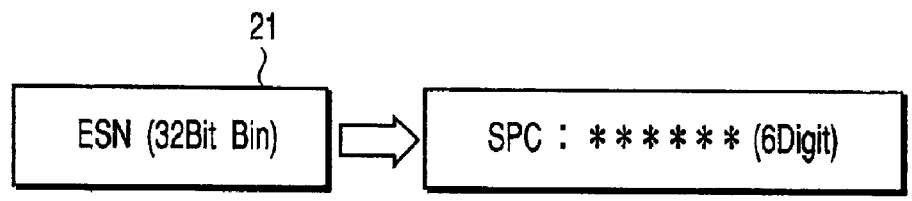
FIG. 3 is a diagram to help explain an SPC creating method.
Figure 4:
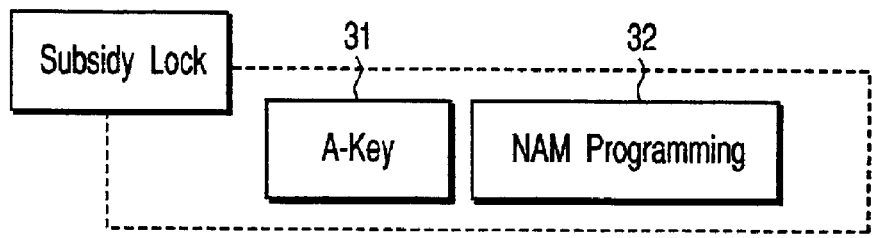
FIG. 4 shows an example of a control data group guarded by Subsidy Lock.

Using the Subsidy Lock Code, the Subsidy Lock section 12*a*, as shown in FIG. 4, applies a guard to the A-Key 31, the NAM Programming, and the data group 32 set by the NAM Programming, which have been stored in the memory 13. At this time, a 6-digit SPC created on the basis of the ESN 21 stored in the memory 13 is used as the Subsidy Lock Code as shown in FIG. 3.

Figure 5:
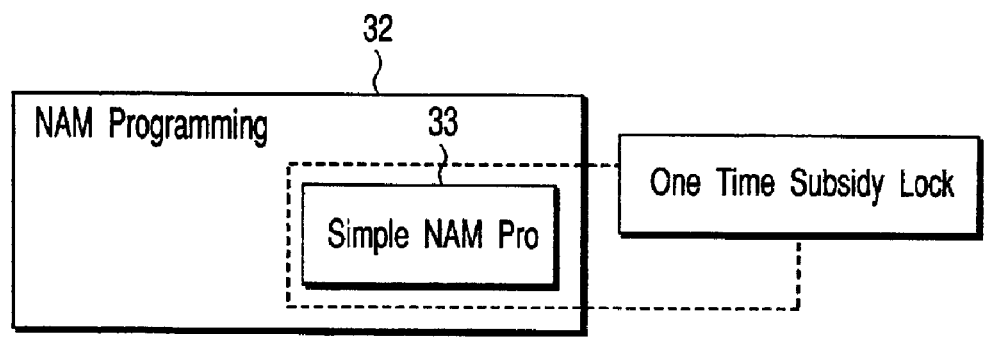
FIG. 5 shows an example of a control data group guarded by One-time Subsidy Lock.

As shown in FIG. 5, using a One-Time Subsidy Lock Code 24, the One-Time Subsidy Lock section 12b applies a guard to the Simple NAM Programming 33 included in the NAM Programming stored in the memory 13.

When receiving the 6-digit SPC created on the basis of the ESN 21, the One-Time Subsidy Lock setting control section 12c goes into a state where it can register the One-Time Subsidy Lock Code. In this state, the One-Time Subsidy Lock setting control section 12c takes in the One-Time Subsidy Lock Code input from, for example, a maintenance terminal apparatus (not shown) and stores the taken-in One-Time Subsidy Lock Code in the memory 13.

As for SPC, it has been described in detail in TIA/EIA Standard "TIA/EIA-IS683A" and CDMA Developers Group "Programming Lock CDG State 2, 3 Description ver. 1.04."

Next, the operation of changing the control data executed at a mobile phone terminal configured as described above will be explained by reference to FIG. 6.

First, in state A, or in a state where a mobile phone terminal has not been sold by a carrier or a terminal maker yet, neither Subsidy Lock Code nor One-Time Subsidy Lock Code has been registered. Therefore, both the Subsidy Lock Status and One-time Subsidy Lock Status are invalid. Consequently, in this state, neither NAM Pro nor Simple NAM Pro is started up.

In this state, the carrier or the person in charge of the maker, in step 6a, sets the terminal to a state where the Subsidy Lock Code can be registered, in order to make valid the Subsidy Lock on A-Key, NAM Pro, and the control data group set by the NAM Pro. Here, the terminal is still under the management of the carrier or the maker. Therefore, secrecy is not required in the course of setting the terminal to the state where the Subsidy Lock Code can be registered. As a result, an arbitrary method can be applied to the process in step 6a.

Next, the carrier or the person in charge, in step 6b, inputs the Subsidy Lock Code to the terminal from a maintenance terminal apparatus. At this time, a 6-bit SPC created on the basis of a 32-bit ESN allocated uniquely to the terminal is used as the Subsidy Lock Code. The SPC is notified to the carrier created at the maker. After the Subsidy Lock Code has been registered in the memory 13 as a result of the input, the terminal goes into state B. That is, Subsidy Lock Status is set "Valid." Consequently, NAM Pro and the control data group set by the NAM Pro are protected in such a manner that Subsidy Lock is applied to them, or that they cannot be changed from outside.

Here, suppose a user has purchased the mobile communication terminal. At this time, the salesclerk or the user himself or herself registers a phone number in the terminal. To register a phone number, however, it is necessary to temporarily release the One-Time Subsidy Lock on the Simple NAM Pro and the control data group already set by the Simple NAM Pro.

Then, the carrier or the person in charge, in step 6c, sets the operation mode of the terminal to a state where One-Time Subsidy Lock Code can be registered. Because the setting process must be kept secret from the user, it is carried out using a security code. A code including an SPC used as the Subsidy Lock Code is used as the security code.

After the One-Time Subsidy Lock Code can be registered, the carrier or the person in charge, in step 6d, carries out the operation of registering the One-Time Subsidy Lock Code. As a result, the One-Time Subsidy Lock Code is registered in the memory 13 of the terminal as shown in state C of FIG. 6. Accordingly, the One-Time Subsidy Lock Status becomes "Valid." That is, Simple NAM Pro and the control data set by the Simple NAM Pro have been protected in such a manner that they cannot be changed from outside.

The salesclerk or user, in step 6e, inputs a release code corresponding to the One-Time Subsidy Lock Code to the terminal. The release code is input by using a maintenance terminal apparatus or the input section 14 of the mobile communication terminal. Inputting the release code causes the One-Time Subsidy Lock on the terminal to be released. As a result, Simple NAM Pro is started up in step 6f. Therefore, in this state, when the salesclerk or user inputs a phone number to the terminal, the phone number is taken in by the terminal. Then, the Simple NAM Pro stores it in the memory 13.

After the phone number registering process has been completed, the Simple NAM Pro deletes the registered One-Time Subsidy Lock Code. As a result, the terminal returns from state D to state B. Thus, in the terminal, One-Time Subsidy Lock Status becomes "Invalid" again, which prevents Simple NAM Pro from being started up. Consequently, even if the user knows the One-Time Subsidy Lock Code, the phone numbers registered in the memory 13 from this time on are held reliably unless the user knows the security code.

As described above, in the embodiment, when One-Time Subsidy Lock on Simple NAM Pro used in registering phone numbers is released temporarily, a security code made up of an SPC is input to the terminal, thereby bringing the terminal into a state where the One-Time Subsidy Lock Code can be registered. Then, in this state, the One-Time Subsidy Lock Code is registered. This enables the process of registering the One-Time Subsidy Lock Code to be kept secret, which makes it possible to reliably prevent the user from changing the phone numbers illegally.

Furthermore, the SPC used as the Subsidy Lock Code has been used as the security code for enabling the registration of One-Time Subsidy Lock Code. As a result, the security code that the maker and carrier manage is only one SPC, which simplifies the management of security codes.

Moreover, in the embodiment, One-Time Subsidy Lock on Simple NAM Pro is released in the state where Subsidy Lock on the A-Key, the NAM Programming, and the control data set by the NAM Programming has been made "Valid." Consequently, One-Time Subsidy Lock on Simple NAM Pro can be released without any adverse effect on the protection of the A-Key, the NAM Programming, and the control data set by the NAM Programming.

The present invention is not limited to the above embodiment. For instance, while in the embodiment, SPC is used as a security code for enabling the registration of One-Time Subsidy Lock Code, a high-secrecy code created by another algorithm may be used.

As for the type and configuration of the mobile communication terminal, the procedure for releasing One-Time Subsidy Lock, the type of the control data groups, and others, this invention may be practiced or embodied in still other ways without departing from the spirit or essential character thereof.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A mobile communication terminal comprising:
   a storage for storing control data used to control an operation of the mobile communication terminal;
   first means, operating in response to input a security code created by a predetermined algorithm, for setting an operation mode of the mobile communication terminal to a registration preparing state where a lock code, which is used to protect a part of the control data, can be registered;
   second means, operating in response to input the lock code with the registration preparing state being set, for registering the lock code in the storage and setting the operation mode to a protective state where the part of the control data cannot be changed;
   third means, operating in response to input a lock release code corresponding to the lock code with the protective state being set, for releasing the protective state temporarily, thereby enabling the part of the control data to be changed; and
   fourth means for deleting the registered lock code after the change of the part of the control data and restoring the registration preparing state.

2. The mobile communication terminal according to claim 1, wherein
   the security code is created on the basis of an electronic serial number uniquely allocated to the mobile communication terminal.

3. A mobile communication terminal comprising:
   a storage for storing first and second control data used to control the operation of the mobile communication terminal where the second data is part of the first data;
   first means, operating to input a first lock code, for registering the first lock code in the storage and setting and operation mode of the mobile communication terminal to a first protective state where the first control data cannot be changed;
   second means, operating in response to input a security code created by a predetermined algorithm with the first protective state being set, for setting the operation mode to a registration preparing state where a second lock code can be registered;
   third means, operating in response to input the second lock code with the registration preparing state being set, for registering the second lock code in the storage and setting the operation mode to a second protective state where the first control data cannot be changed;
   fourth means, operating in response to input a lock release code corresponding to the second lock code with the protective state being set, for releasing the second protective state temporarily, thereby enabling the second data to be changed; and
   fifth means for deleting the registered second lock code after the change of the second control data and restoring the registration preparing state.

4. The mobile communication terminal according to claim 3,
   wherein the security code is created on the basis of the first lock code.

5. A mobile communication terminal comprising:
   a memory configured to store Authentication Key, Number Assignment Module Programming, first and second data set by the Number Assignment Module Programming, and Simple Number Assignment Module Programming for changing the second data where the second data is part of the first data;
   first means, operating in response to input a Subsidy Lock Code, for registering the Subsidy Lock Code in the memory and setting an operation mode of the mobile communication terminal to a first protective state where the first and second data cannot be changed;
   second means, operating in response to input a security code created by a predetermined algorithm with the first protective state being set, for setting the operation mode to a registration preparing state where a One-Time Subsidy Lock Code can be registered;
   third means, operating in response to input the One-Time Subsidy Lock Code with the registration preparing state being set, for registering the One-Time Subsidy Lock Code to the memory and setting the operation state to a second protective state where first-data cannot be changed;
   fourth means, operating in response to input a lock release code corresponding to the One-Time Subsidy Lock Code with the second protective state being set, for releasing the second protective state temporarily, thereby enabling the second data to be changed; and
   fifth means for deleting the One-Time Subsidy Lock Code after the change of the stored second data and restoring the registration :preparing state.

6. A control data changing method of changing the control data which is stored in a memory to control an operation of a mobile communication terminal, comprising:
   a step of, operating in response to input a security code created by a predetermined algorithm, setting an operation mode of the mobile communication terminal to a registration preparing state where a lock code, which is used to protect a part of the control data, can be registered;
   a step of, operating in response to input the lock code with the registration preparing state being set, registering the lock code in the memory and setting the operation mode to a protective state where the part of the control data cannot be changed;
   a step of, operating in response to input a lock release code corresponding to the lock code with the protective state being set, releasing the protective state temporarily, thereby enabling the part of the control data to be changed; and
   a step of deleting the registered lock code after the change of the part of the control data and restoring the registration preparing state.

7. A control data changing method of selectively changing first and second control data which are stored in a memory, comprising:
   a step of, operating to input a first lock code, registering the first lock code in the memory and setting an operation mode of the mobile communication terminal to a first protective state where the first control data cannot be changed;
   a step of, operating in response to input a security code created by a predetermined algorithm with the first protective state being set, setting the operation mode to a registration preparing state where a second lock code can be registered;
   a step of, operating in response to input the second lock code with the registration preparing state being set, registering the second lock code in the memory and setting the operation mode to a second protective state where the first control data cannot be changed;

a step of, operating in response to input a lock release code corresponding to the second lock code with the protective state being set, releasing the second protective state temporarily, thereby enabling the second data to be changed; and a step of deleting the registered second lock code after the change of the second control data and restoring the registration preparing state.

8. A mobile communication terminal comprising:

a memory configured to store control data used to control an operation of the mobile communication terminal;

a first section configured to, operate in response to input a security code created by a predetermined algorithm, set an operation mode of the mobile communication terminal to a registration preparing state where a lock code, which is used to protect a part of the control data, can be registered;

a second section configured to, operate in response to input the lock code with the registration preparing state being set, register the lock code in said memory and set the operation mode to a protective state where the part of the control data cannot be changed;

a third section configured to, operate in response to input a lock release code corresponding to the lock code with the protective state being set, release the protective state temporarily, thereby enabling the part of the control data to be changed; and a fourth section configured to delete the registered lock code after the change of the part of the control data and restore the registration preparing state.

9. The mobile communication terminal according to claim 8, wherein the security code is created on the basis of an electronic serial number uniquely allocated to the mobile communication terminal.

10. A mobile communication terminal comprising:

a memory configured to store first and second control data used to control the operation of the mobile communication terminal where the second data is part of the first data;

a first section configured to, operate to input a first lock code, register the first lock code in the memory and set an operation mode of the mobile communication terminal to a first protective state where the first control data cannot be changed;

a second section configured to, operate in response to input a security code created by a predetermined algorithm with the first protective state being set, set the operation mode to a registration preparing state where a second lock code can be registered;

a third section configured to, operate in response to input the second lock code with the registration preparing state being set, register the second lock code in the memory and set the operation mode to a second protective state where the first control data cannot be changed;

a fourth section configured to, operate in response to input a lock release code corresponding to the second lock code with the protective state being set, release the second protective state temporarily, thereby enabling the second data to be changed; and a fifth section configured to delete the registered second lock code after the change of the second control data and restore the registration preparing state.

11. The mobile communication terminal according to claim 10, wherein the security code is created on the basis of the first lock code.

12. A mobile communication terminal comprising:

a memory configured to store Authentication Key, Number Assignment Module Programming, first and second data set by the Number Assignment Module Programming, and Simple Number Assignment Module Programming for changing the second data where the second data is part of the first data;

a first section configured to, operate in response to input a Subsidy Lock Code, register the Subsidy Lock Code in the memory and set an operation mode of the mobile communication terminal to a first protective state where the first and second data cannot be changed;

a second section configured to, operate in response to input a security code created by a predetermined algorithm with the first protective state being set, set the operation mode to a registration preparing state where a One-Time Subsidy Lock Code can be registered;

a third section configured to, configured to operate in response to input the One-Time Subsidy Lock Code with the registration preparing state being set, register the One-Time Subsidy Lock Code to the memory and setting the operation state to a second protective state where the first-data cannot be changed;

a fourth section configured to, operate in response to input a lock release code corresponding to the One-Time Subsidy Lock Code with the second protective state being set, release the second protective state temporarily, thereby enabling the second data to be changed; and a fifth section configured to delete the One-Time Subsidy Lock Code after the change of the stored second data and restore the registration :preparing state.

13. A mobile communication terminal comprising:

a memory configured to store control data used to control an operation of the mobile communication terminal;

a first section configured to, operate in response to input a security code using keys, set an operation mode of the mobile communication terminal to a first mode where a lock code is allowed to store the memory using keys;

a second section configured to, operate in response to input the lock code using the keys, register the lock code in the memory and set the operation mode to a second mode where the control data is protected against change using the keys;

a third section configured to, operate in response to input a lock release code corresponding to the lock code with the second mode, set the operation mode to a third mode where the control data is allowed to change using the keys; and a fourth section configured to delete the lock code after the change of the control data and restore the operation mode to the first mode.

* * * * *